United States Patent [19]

Pickerrell et al.

[11] Patent Number: 4,874,009
[45] Date of Patent: Oct. 17, 1989

[54] ANTI-SEIZING CAP RING

[75] Inventors: Daniel A. Pickerrell, Noblesville; Donald C. Schrock, Carmel, both of Ind.; Larry G. Turner, Fenton, Mich.

[73] Assignee: Masco Corporation of Indiana, Taylor, Mich.

[21] Appl. No.: 240,330

[22] Filed: Sep. 6, 1988

[51] Int. Cl.[4] ............... F16K 11/02; F16K 51/00
[52] U.S. Cl. .................. 137/454.6; 137/625.4; 137/625.41; 277/DIG. 6
[58] Field of Search ............ 137/454.6, 625.4, 625.41, 137/625.17; 277/136, 137, DIG. 6; 251/361, 362

[56] References Cited

U.S. PATENT DOCUMENTS

| | | | |
|---|---|---|---|
| 1,614,437 | 1/1927 | Cochran | 137/625.41 |
| 1,988,966 | 1/1935 | Eckhouse | 137/454.6 |
| 2,676,610 | 4/1954 | Hare | 137/454.6 |
| 3,422,849 | 1/1969 | Manoogian | 137/625.41 |
| 3,780,758 | 12/1973 | DeVries | 137/454.6 |
| 3,814,120 | 6/1974 | Moen | 137/454.6 X |
| 3,915,195 | 10/1975 | Manoogian et al. | 137/625.41 |
| 4,043,359 | 8/1977 | Christo | 137/625.41 |
| 4,156,438 | 5/1979 | Kiesow | 137/625.41 |
| 4,301,830 | 11/1981 | Keller, III | 137/454.6 |
| 4,449,551 | 5/1984 | Lorch | 137/625.41 |

Primary Examiner—John Rivell
Attorney, Agent, or Firm—Steven L. Permut; Malcolm L. Sutherland

[57] ABSTRACT

A valve housing assembly includes a valve body member that has an exterior threaded section which can engage an interior threaded section of a cap member. The cap member and valve body member have opposing shoulders. An abutment ring made from a semi-rigid material of talc filled propylene is interposed between the two opposing shoulders and provides for seal between the two opposing shoulders to the threaded section. Furthermore, the semi-rigid abutment ring will undergo slight compression when the cap member is fully tightened onto the body member and will creep back over a period of time to alleviate vertical forces which can cause seizing of the threaded sections of the cap member and body member which would otherwise prevent easy removal of the cap member from the body member. Furthermore, the sealing of the ring between the two shoulders reduces the chance of corrosion by eliminating water leaking into the threaded section from the interior of the valve body. The seal further reduces forces that seize the cap onto the body member and provides for a cap member which is easily removable from the body member long after it has been tightened onto the body member.

7 Claims, 1 Drawing Sheet

U.S. Patent  Oct. 17, 1989  4,874,009
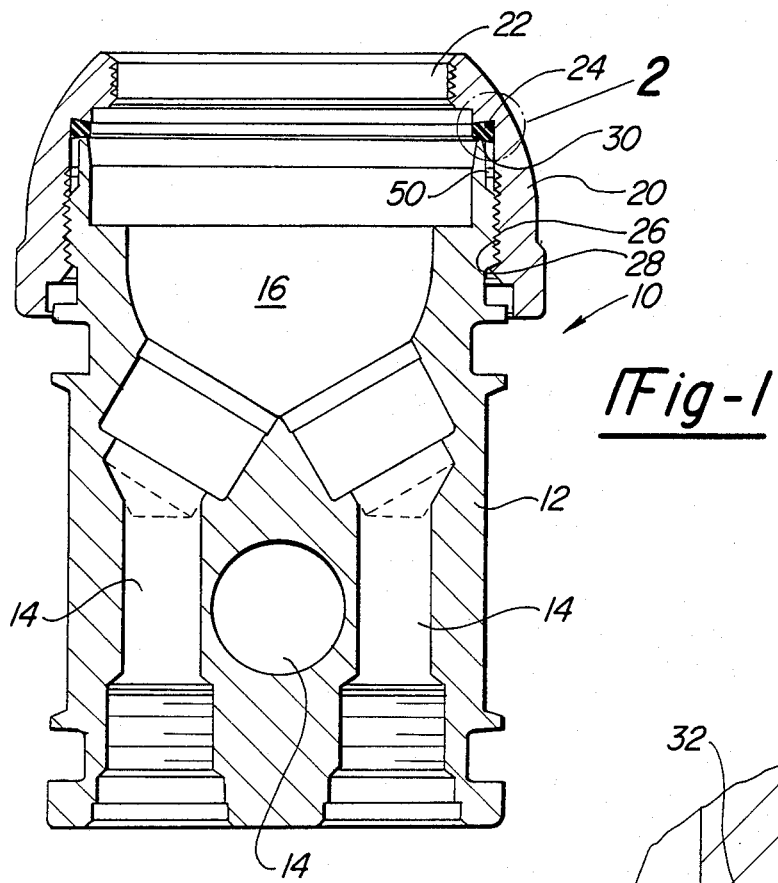
*Fig-1*
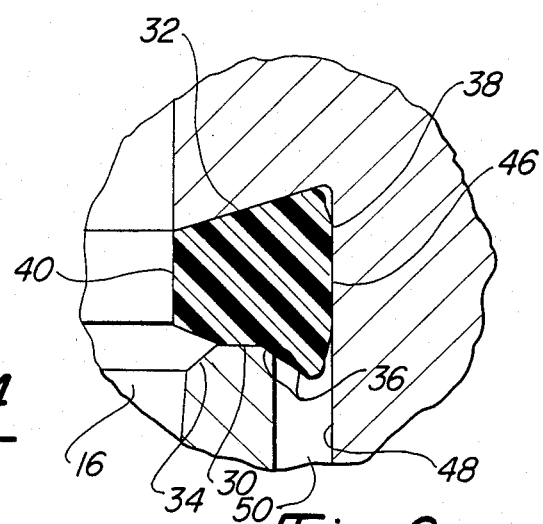
*Fig-4*
*Fig-2*
*Fig-3*

ANTI-SEIZING CAP RING

TECHNICAL FIELD

This invention relates to a valve and cap housing assembly and more particularly with a member interposed therebetween that seals and prevents seizing of the cap to the valve body.

BACKGROUND OF THE INVENTION

Valve housing assemblies often have a valve body member with a cap threaded thereon. The cap member is needed to retain the valve mechanism within the cavity of the valve housing. The cap member once installed needs to occasionally be removed for access to the valve mechanism for maintenance and repair. The cap is also constructed with an abutment shoulder to abut a complementary shoulder in the valve body member to provide a stop to prevent overtightening and overcompression of the valve mechanism.

Many cap members have been designed so that they only need to be hand tightened. Adjustment rings threadably engage an inner rim of the cap member to properly seat the valve elements. However, people try to tighten the cap and not use the adjustment ring in spite of the fact that written instructions call for using the adjustment ring. Unnecessary efforts are often made to even further tighten the cap onto the valve body member after the adjustment shoulder abuts the complementary shoulder. Such efforts overtighten the cap member onto the body member and can cause difficulties in removal of the cap. Proper removal of the cap calls for loosening of the adjustment ring. However, written instructions calling for the loosening of the adjustment ring are also sometimes ignored and the cap is often loosened without first loosening the adjustment ring.

The force needed to loosen the cap can be further aggravated due to corrosive action of water that may drip into the threaded section of the cap and valve housing member over long periods of time.

What is needed is an abutment mechanism which provides for a fixed stop between the cap member and valve body member but has a release mechanism which reduces the locking force needlessly exerted by some people so that when the cap needs to be removed it can be easily removed in spite of the fact that the cap was overtightened or the adjustment ring was not first loosened.

SUMMARY OF THE INVENTION

In accordance with one aspect of the invention, a valve housing assembly includes a body member having ports therein for water flow therethrough and a cavity for receiving a valve mechanism. The valve body also includes a threaded section and an end shoulder. A cap member includes a central opening for receiving a control handle mechanism therethrough. About the opening is a complementary shoulder section that opposes the end shoulder of the body member. The cap member also has a complementary threaded section for engagement with the threaded section of the body. A semi-rigid abutment member is interposed between the opposing shoulders for providing an abutment stop as the cap is threadably tightened onto the body. The semi-rigid member is made from a material that has creep so that after the cap is overtightened onto the body, the semi-rigid member that is now under compression creeps to alleviate seizing forces between the respective threaded sections to allow the cap to be threadably loosened from the body member thereafter.

Preferably the abutment member is an annular ring which seats on the opposing shoulders to provide a seal therebetween with the threaded sections being on the exterior side of the seal with respect to the valve cavity in the body member. Preferably the threaded section of the body is on an exterior wall of the body and the cap has its threaded section on an interior wall thereof.

The abutment member is a ring that has a thickness at its inner diameter less than the thickness at its outer diameter to provide angled top and bottom surfaces to be in contact with the respective opposing shoulders of the cap and body member. The ring has a plurality of exterior ribs that are compressible against an inner annular wall of one of the body or cap member to retain the annular member in place before the cap member is tightened onto the body member.

According to another aspect of the invention, an anti-seizing ring for a valve body member and cap member of a valve housing assembly has an outer substantially vertical wall and an upper and lower canted wall that are canted toward each other and converging toward an inner diameter of the ring. The ring is made from a semi-rigid material with the upper and lower canted walls being sealingly abutable against a body member and a cap member of a valve housing assembly.

In this fashion, the abutment ring provides for a stop when the cap is overtightened onto the body member. In addition, the abutment ring, by having a semi-rigid characteristic, creeps which would then alleviate any locking forces introduced between the threads of the cap and body member. In addition, the abutment ring provides for a seal which prevents any water from passing through the two opposing shoulders into threaded engagement of the two threaded sections which reduces the chance of corrosion over long periods of time. By eliminating the corrosion, the force needed to loosen the cap member from the body member again is kept to a reduced level. The elimination of any seizing forces such as the wedging force between the threaded section and the seizing forces caused by corrosion between the threaded sections allows the cap to be easily removable.

BRIEF DESCRIPTION OF THE DRAWINGS

Reference now will be made to the accompanying drawings in which:

FIG. 1 is a side elevational and segmented view of a valve body and cap member comprising a valve housing assembly;

FIG. 2 is an enlarged fragmentary view showing the engagement of the abutment ring with the cap member and body member;

FIG. 3 is a perspective view of the ring member; and

FIG. 4 is an enlarged fragmentary and segmented view of the ring member.

DETAILED DESCRIPTION OF THE PREFERRED EMBODIMENT

Referring to FIG. 1, a valve housing assembly 10 includes a body member 12 having ports 14 for water flow therethrough and a cavity or socket 16 for receiving a valve mechanism (not shown for simplicity of the drawing). The valve housing assembly 10 also includes a cap member 20 with a threaded central opening 22 therethrough to receive a control handle or stem that operates the valve mechanism. An adjustment ring (not shown) is adjustably and threadably engaged to the threaded opening 22 to properly seat the valve mechanism. Interposed between the body member 12 and cap member 20 is an abutment ring 24.

The body member 12 has an externally threaded section 26 which engages an internally threaded section 28 of the cap member 20. An upper end of the body member has a shoulder 30 which opposes a complementary shoulder 32 of cap member 20. The shoulder 30 has a tapered inner section 34 and a tapered downward outer section 36. Shoulder 32 is canted downwardly toward a radial center of the cap assembly.

Referring to FIG. 3, the ring 24 has an outer diameter wall 38 and an inner diameter wall 40. A canted upper surface 42 and a canted lower surface 44 extends from the outer wall 38 to the inner wall 40. The ring is made from a semi-rigid material such as talc filled propylene with the talc comprising approximately 40% of the ring material.

The outer wall 38 has three radially outwardly extending ribs 46 which are in a vertical orientation. The ribs are circumferentially spaced about the ring in equal 120 degree intervals.

The ring is sized such that the outer wall 38 closely abuts the interior wall 48 of the cap member 20. The ribs 46 assure that there is a snug fit between the ring 24 and wall 48 to assure that the ring is retained within the cap member before the cap member is mounted onto the valve body member. The upper surface 42 is canted at the same angle as shoulder 32 to provide for a flush fit between the cap member and ring member.

The cap member 20 is threadably tightened onto body member 12 with threaded section 26 of the cap member 20 and threaded section 28 of the body member 12 engaging each other. The cap member is tightened until the shoulder 30 abuts the abutment ring 24 which provides a stop. The ring is semi-rigid to provide for slight compression of the ring against the shoulder 30 as shown in FIG. 2 but stiff enough to maintain a definite stop position that is easily noticeable to a person tightening the cap member onto the body member. Once the cap is tightened, a seal is provided between the cap member 20 and body member 12 to seal the interior cavity 16 from the gap 50 extending to the threaded sections 26 and 28. The plastic semi-rigid ring 24 will tend to creep to alleviate any locking forces that are exerted between the threaded sections 26 and 28 by the exertion of vertical forces between the shoulder 30, ring 24, and shoulder 32. Furthermore, the seal which seals the gap 50 prevents water from leaking therein to minimize the chances of corrosion at the thread members that can further aggravate the seizing up an overtightened cap member to the valve body member.

When replacement of internal parts or repair of the valve housing is necessary, the abutment ring has eliminated the locking force between the threaded sections 26 and 28. Cap member 20 can therefore be easily threadably removed from the body member 12 even if it was overtightened and sat for a long time in the overtightened condition and even if the adjustment ring in opening 22 was not loosened.

The abutment ring, by being semi-rigid with a talc filled propylene material, provides for sufficient hardness to indicate to a person tightening the cap that the stop member has been reached but yet will creep and eventually alleviate the stresses introduced by stop members onto the threaded sections 26 and 28. The creep over a period of time alleviates this stress.

Furthermore, the abutment ring provides a seal which prevents water from leaking into the threaded section. The seal can, over long periods of time, reduce the chance of corrosion which would further aggravate the problem of a cap seizing onto a valve body member when overtightened. The abutment ring, by performing two functions, can easily solve the problem of a cap member being seized onto a valve body member. The cap member thus is assured to be easily removable from the body member to provide for the needed servicing of the interior of the valve housing assembly. The ease of removing the cap member is assured even when the cap is overtightened and the adjustment ring is not loosened. The ring thus provides an assurance feature for the cap member to function correctly even when proper instructions are not followed and the faucet encounters some abuse.

Variations and modifications of the present invention are possible without departing from the scope and spirit as defined in the appended claims.

We claim:

1. A valve housing assembly including:
   a body member having ports for water flow and a cavity for receiving a valve mechanism; said body member having a threaded section, and an end shoulder exterior of said cavity
   a cap having a central opening for receiving a control handle therethrough, a complementary shoulder section about said opening opposing said end shoulder of said body member and having a complementary threaded section for engagement with said threaded section of said body;
   a semi-rigid abutment means interposed between said opposing shoulders for providing an abutment stop as said cap is threadably tightened onto said body;
   said semi-rigid abutment means having creep after said cap is tightened onto said body to alleviate seizing forces between said respective threaded sections to allow said cap to be threadably loosened from said body member.

2. A valve housing assembly as defined in claim 1 wherein said abutment means is an annular ring which seats on said shoulders to provide a seal therebetween with said threaded section of said body and complementary threaded sections of said cap being on an exterior side of said seal to prevent water from inside said cavity to pass through said seal to said threaded sections.

3. A valve housing assembly as defined in claim 2 wherein said threaded section of said body is on an exterior wall of said body and said cap having its threaded section on an interior wall of said cap.

4. A valve housing assembly as defined in claim 2 wherein said ring has a thickness at its inner diameter less than its thickness at its outer diameter to provide angled top and bottom surfaces to be in contact with said respective shoulders.

5. A valve housing assembly including:
   a body member having ports for water flow and a cavity for receiving a valve mechanism; said body member having a threaded section, and an end shoulder;
   a cap having a central opening for receiving a control handle therethrough, a complementary shoulder section about said opening opposing said end shoulder of said body member and having a complementary threaded section for engagement with said threaded section of said body;

a semi-rigid abutment means interposed between said opposing shoulders for providing an abutment stop as said cap is threadably tightened onto said body;

said semi-rigid abutment means having creep after said cap is tightened onto said body to alleviate seizing forces between said respective threaded sections to allow said cap to be threadably loosened from said body member;

said abutment means being an annular ring which seats on said shoulders to provide a seal therebetween with said threaded section of said body and complementary threaded section of said cap being on an exterior side of said seal; and said ring has a plurality of exterior ribs that are compressible against an inner annular wall of one of said body member or cap to retain said annular member in place before said cap member is tightened onto said body member.

6. An anti-seizing ring for a body and cap member of a valve housing assembly, said ring characterized by:

an outer substantially vertical wall;

an upper canted wall and a lower canted wall canted toward each other and converging toward the inner diameter of said ring;

said ring being made from a semi-rigid material;

said upper and lower canted walls being sealingly abutable against the body member and the cap member of the valve housing assembly.

7. An anti-seizing ring for a body and cap member of a valve housing assembly, said ring characterized by:

an outer substantially vertical wall;

an upper canted wall and a lower canted wall canted toward each other and converging toward the inner diameter of said ring;

said ring being made from a semi-rigid material;

said upper and lower canted walls being sealingly abutable against the body member and the cap member of the valve housing assembly;

said outer substantially vertical wall having a plurality of outwardly extending ribs for abutment against and retaining said one of said cap and body member fixed with said ring before assembly of said valve housing assembly.

* * * * *